United States Patent

[11] 3,604,600

| [72] | Inventor | Andre Taupin |
| | | Nievre, France |
| [21] | Appl. No. | 811,687 |
| [22] | Filed | Mar. 24, 1969 |
| [45] | Patented | Sept. 14, 1971 |
| [73] | Assignee | Jean-Paul Taupin |
| | | Le Vivier, Urzy, Nievre, France |
| [32] | Priority | Mar. 27, 1968 |
| [33] | | France |
| [31] | | 145,719 |

[54] PARTICULATE MATERIAL DISCHARGE FROM CONTAINERS
10 Claims, 9 Drawing Figs.

[52] U.S. Cl. ..................................................... 222/271,
74/240, 222/413
[51] Int. Cl. ...................................................... B65g 33/10,
F16h 7/18
[50] Field of Search............................................ 222/271,
272, 413, 196; 259/6; 74/740

[56] References Cited
UNITED STATES PATENTS

| 3,228,561 | 1/1966 | Rosenberg..................... | 222/413 X |
| 3,165,237 | 1/1965 | Stevens ......................... | 222/56 |
| 2,538,886 | 1/1951 | Skibbe et al. .................. | 222/271 X |
| 2,333,739 | 11/1943 | Puckett ......................... | 259/6 |
| 1,835,989 | 12/1931 | Hofft et al..................... | 222/271 |
| 1,606,750 | 11/1926 | Clark............................. | 74/240 UX |
| 0,940,538 | 11/1909 | LeGore ......................... | 222/196 |

FOREIGN PATENTS

| 1,434,363 | 2/1966 | France .......................... | 222/271 |
| 0,055,357 | 7/1890 | Germany....................... | 222/413 |

Primary Examiner—Leonard Summer
Attorney—Prutzman, Hayes, Kalb & Chilton

ABSTRACT: A device for the discharge of a particulate material from the bottom of a silo of the kind including a plurality of rotary helical members, for example springs, juxtaposed laterally at the bottom of the silo and leading to a discharge opening. In order to prevent any tendency to block lateral flow of the material, the bottom is flat and the space between adjacent helical members is less than the small thickness of a wall of powdered material which might support an arch of material thereabove.

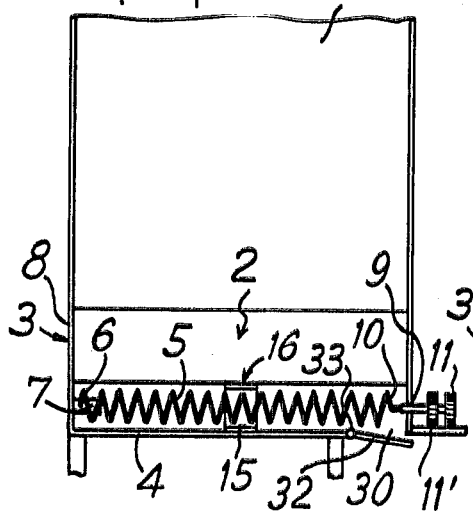
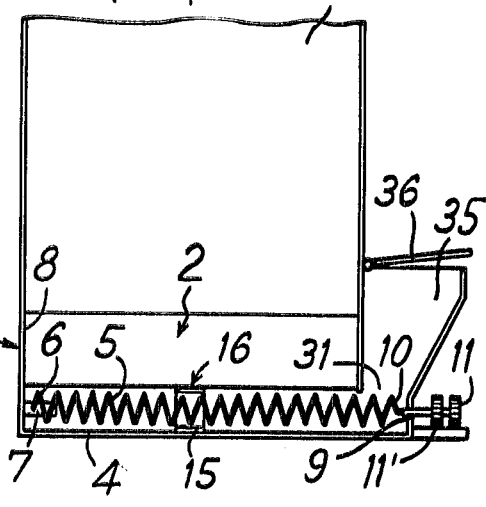
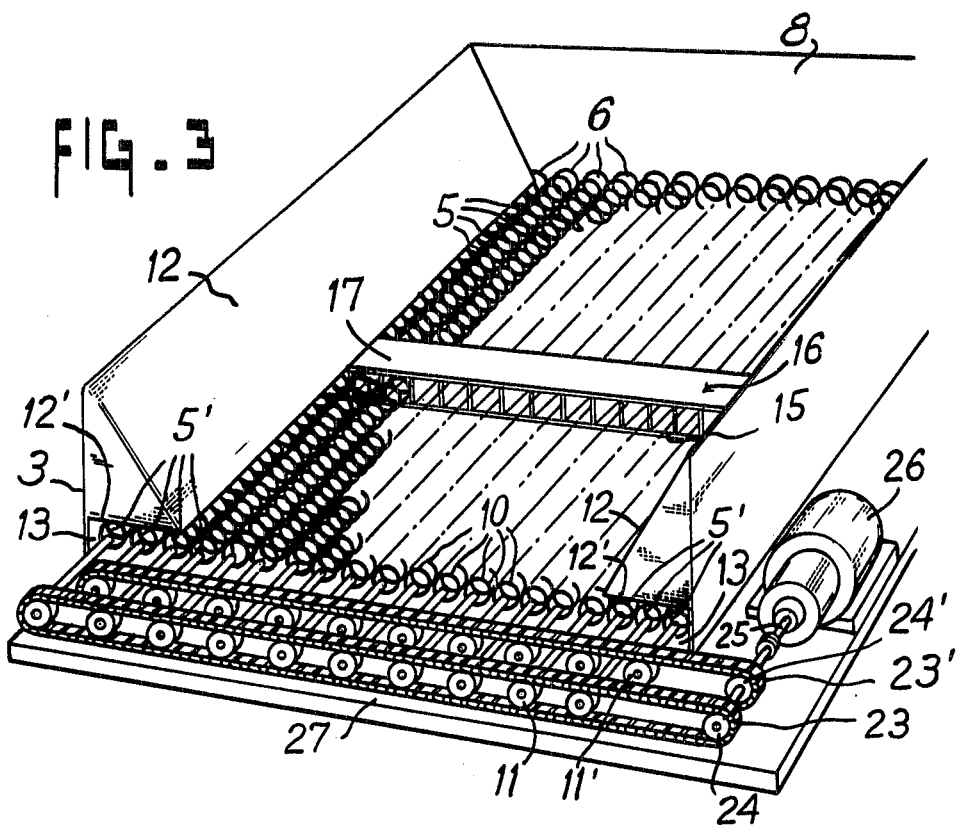
Inventor
ANDRE TAUPIN

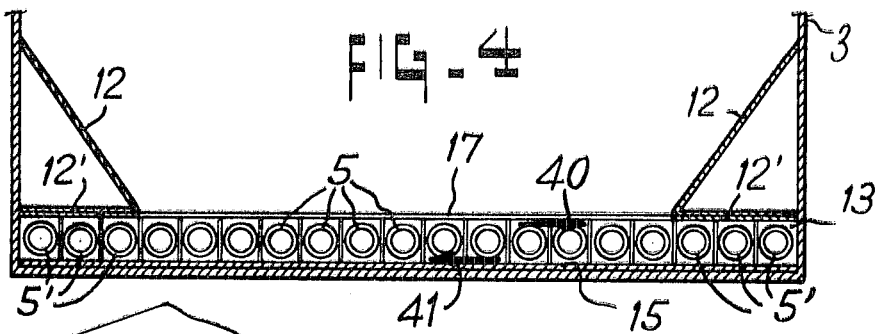
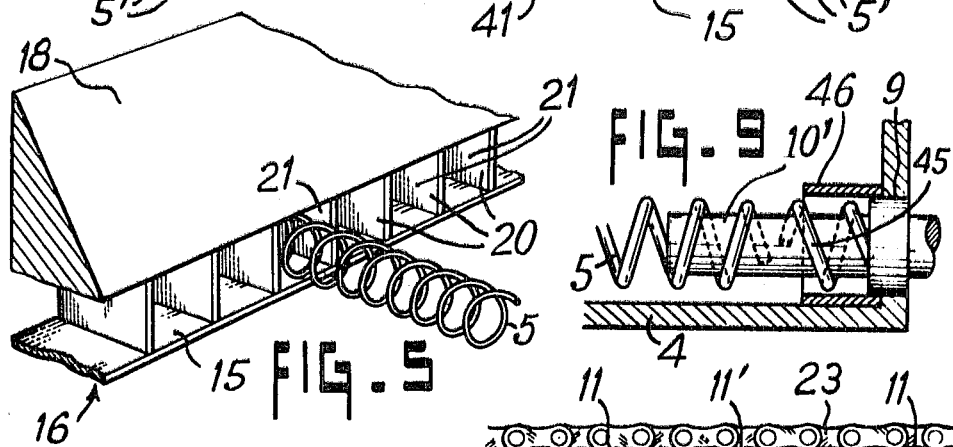
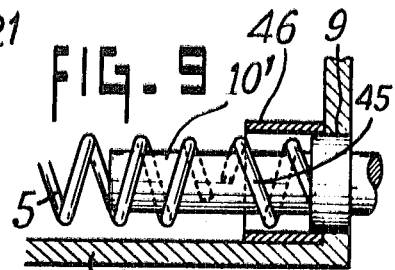
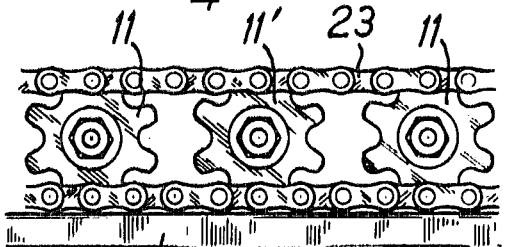
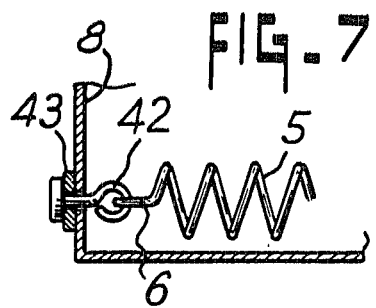
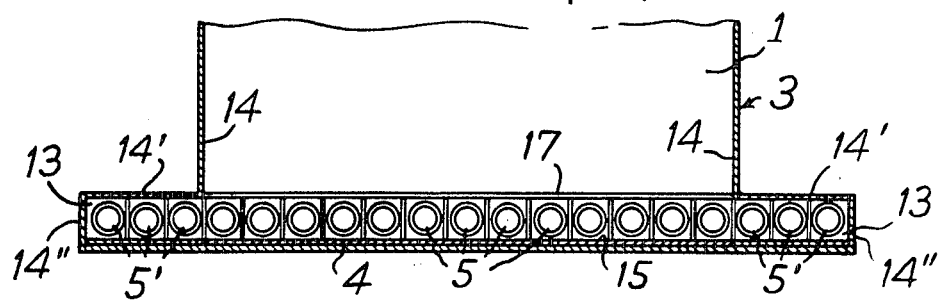

PARTICULATE MATERIAL DISCHARGE FROM CONTAINERS

1. Field of the Invention

The present invention relates to the handling of granular and powdery materials in particularly, but not exclusively, to the discharge thereof from a silo or other container.

2. Summary of the Prior Art

When a stock of granular of powdery materials is to be kept, it is usual to keep it in silos, which are often very high and which are filled from the tip. Material is drawn off at the bottom as and when required. This method of removal is satisfactory in the case of materials that run freely.

However, many materials of a granular nature and even more so those which are powdery, such as flour for example, when kept in large quantities in a silo, are apt to "pack" and form vaulted cavities, which greatly hinder their withdrawal.

These materials although very fluid when on the move, behave when stationary under load as compact solids, forming vaulted cavities capable of shoring up considerable masses and completely stopping the flow towards the silo delivery opening. These blockages occur all the more readily because the interior walls of the silo slope at the bottom towards the delivery opening, to enable the entire contents of the silo to be discharged by force of gravity. Mechanical action has to be applied to the material, so as to break up the cavities, by vibration, for example, or by knocking the walls Moreover, because of the narrowing of the hopper at the base of the silo, the capacity of a silo of given height and cross section is reduced.

Efforts have already been directed towards replacing these gravity clearance hoppers with mechanical discharge equipment. Some devices rely on rotary helical feed members fitted parallel to the silo floor and feeding towards a discharge aperture. Hitherto, however, it has been found that such devices by themselves alone do not enable the contents of a silo to be withdrawn, but must be supplemented by anticavity devices, which prevent the material from forming voids above the helical feed members. Thus, U.S. Pat. No. 2,333,739 discloses details of a discharge mechanism comprising feed worms extending longitudinally at the base of a silo, with further worms running vertically and provided with a rotary drive at the top of the silo, with the possibility of their being moved sideways so as to sweep the interior of the silo and break up any voids which form in the material.

Such equipment is highly complicated, because of the anticavity mechanism needed for maintaining supplies to the horizontal worms. In addition, however, serious problems arise in staring up the horizontal worms, these being buried in the material so that their cores and threads have to bear the weight of an entire column of material.

Another proposed device for withdrawing solids in granular or powder form from the base of a silo, the floor or which is made up of contiguous troughs, is described in French Pat. No. 1,434,363. Rotary helical members such as coil springs are disposed in the troughs, each of which members, as it turns, drives a flow of material towards an elongate discharge aperture, into which the troughs open at the front of the silo.

The springs are driven round simultaneously by a chain driven by a motor. Experience has shown that certain materials particularly subject to packing tend to become compacted in the long run in the base of the troughs, forming accumulations over which the springs slide without being able to penetrate. The effect of this is to counteract the original disposition of the springs and thus to promote the formation of voids or tunnels, within which each of the helical members runs idly, no longer feeding any material forward. While the springs are embedded in material, little torque is required to start them and keep them turning, but the starting torque becomes high when they rub against the floor or a compacted accumulation of material.

An object of the present invention is to provide an improved mechanical extraction device for removing powdery or granular materials that tend to pack and to form voids when stored in a silo or other container, the device being such as to permit the mechanical withdrawal of the steady flow of these materials until the silo is empty.

SUMMARY OF THE INVENTION

According to the present invention there is provided a device for the discharge of powdery or granular or other particulate material from the base of storage bin, silo or other container, comprising a plurality of rotary helical members arranged to be juxtaposed side-by-side at the bottom of the device and leading to at least one discharge opening, the bottom of the device being flat and the lateral spacing between the helical members being less than the thickness of the thinnest wall capable of supporting a vaulted cavity in the material, whereby resistance to lateral flow of the material is substantially prevented.

The helical members preferably consist of helically wound wires and for this purpose coil springs may be used. Such helically wound wires, whatever their cross-sectional shape or the form of drive provided, are surrounded on all sides by the material and slide through this with less effort than a screw thread on a core.

If, however, the helical turns of these wires be fixed to a central core, from which they derive their drive, this core will be subjected to the vertical pressure of the material and will produce frictional forces which, particularly during starting, may be considerable. This problem does not arise when the rotary drive is applied to at least one end of the springs.

Moreover, by virtue of their elasticity, the springs buried in the powdery material gather speed gradually when starting; and this gradual staring means that the starting torque required is small.

The advantage of disposing the rotary helical feed members on a flat floor is that they can be spaced as closely as desired, so that the walls formed by the vertical accumulation of material between adjacent members can be kept thin enough to collapse of their own accord under the load from above and thus cannot offer support to any vaulted cavities that may tend to form astride the members.

It has been found experimentally that discharging devices comprising a bed of longitudinal helical members all rotating in the same direction tended to become the generator not only of a longitudinal flow of material, but also of two lateral movements in opposite directions, one at the top of the helical members and the other at the bottom thereof, that is to say at the floor of the device. The provision of a flat floor is necessary so as to avoid opposition to the tendency of the material to flow laterally, since a floor containing troughs tending to prevent the formation of this flow promotes compacting.

The tendency of the material to flow laterally in two opposite directions arises from the tangential frictional forces exerted on the material by the rotary helical members. This tendency is opposed when the spacing of the helical members does not meet the technical requirement already indicated because of the formation of vault buttresses between the helical members. Moreover, it has been found that by allowing the material to spread sideways and, more particularly, by ensuring that the two flows towards the sides do not impinge on the sidewalls of the device, one cause of packing is eliminated and fluidization is thus improved. Not only is the formation of cavities prevented, but the power required to rotate the helical members is considerably reduced.

In one arrangement in accordance with the invention, a longitudinal deflector can be advantageously provided above certain of the helical members, the effect of which is at least partially to relieve these of the vertical load imposed by the material. The helical members situated below this deflector thus rotate in a decompressed zone, which the two side flows of material, above and below, have no difficulty in entering, whereupon they are scavenged to the front by the helical members which are not loaded by superposed material.

For the purpose of such an arrangement, a longitudinal recess is preferably provided in each sidewall of the device, deep enough to accommodate at least one helical member; the upper side flow discharges into one recess and the bottom side flow discharges into the other, both flows being recovered by the helical elements housed in the recesses.

The removal of compressive forces on the material thus obtained promotes the breakup of cavities in the material that is being withdrawn with facilitates the starting of the helical members. To assist the bottom lateral flow, provision is made for the rotary helical members to be slightly raised above the floor of the device. In this way, the material on the floor of the device is constantly replenished. In addition, the turns of the helical members are completely embedded in the material and are therefore subjected to static pressure on all sides; this makes for easy starting.

When the storage silo or other container and hence also the discharging device in its base are relatively long, "decompression" crossmembers are placed in position transversely over the bed of helical members. This provision is desirable because the pressure exerted by the material at the center of the silo on the midportion of the helical members may be very high; the decompression crossmembers by which the helical members are spanned from place to place enable the static pressure of the material on them to be reduced.

These crossmembers, however, must be spaced far enough apart to prevent the material from forming vaulted cavities buttressed on these crossmembers. Every type of material requires a particular anticavity area, according to the maximum area of the cavities that can form without collapsing of their accord. This area governs the minimum spacing to be maintained between the decompression crossmembers so as to ensure the prevention of cavity formation.

The mechanical discharging device in accordance with the invention has many advantages; it can be adapted both to lofty silos and to storage bins or containers of more modest size, such as are to be found in use for flour in bakeries.

It slides in the manner of a drawer into the base of the storage holder and is therefore easy to install. It enables the size of storage installations to be reduced as far as possible, since it provides for the almost complete evacuation of material from a flat-bottomed container.

Moreover, because of the deflector members and the fact that the material on the floor is replenished, the residues from a previous filling are evacuated as soon as the withdrawal of the fresh material commences after refilling.

The starting torque required for the helical members is approximately the same as the torque applied during normal running. There is thus no peak loading, which is a drawback when an electric motor provides the drive, nor is anything gained by giving the mechanical parts the extra strength needed to withstand starting conditions.

Above all, the improvements incorporated in this mechanical discharging device with helical members make it possible to obtain a uniform discharge by mechanical fluidization of the material, which descends in a controlled manner within the holder, free from sudden, irregular falls of large masses of material.

Finally, the material can be discharged through a trapdoor placed below the device; but the ability of the helical members to drive the material along, can also be used advantageously by arranging for this to emerge through an aperture situated above these helical members and at the base of a trough, in which the material rises gradually as it accumulates.

BRIEF DESCRIPTION OF THE DRAWINGS

FIGS. 1 and 2 are schematic sections in a longitudinal vertical plane, showing two different forms of discharge apertures. In these Figures, the discharging device proper is fitted below a rectangular section container;

FIG. 3 is a fragmentary perspective view schematically illustrating the discharging device;

FIG. 4 shows the discharging device in cross section;

FIG. 5 is a perspective view of an alternative embodiment of the device;

FIG. 6 shows the mechanism for driving the helical members;

FIG. 7 shows an alternative form of rear attachment for the helical members;

FIG. 8 is a cross section of an alternative embodiment of the discharging device; and FIG. 9 shows details of part of the helical members, at the discharge aperture.

FIGS. 1 and 2 show a rectangular-sectioned flour bin, 1, such as may be found, for example, in bakeries. The sides of this bin are vertical and in the base is a discharging device 2, in accordance with the invention. This device comprises a casing 3, with a flat, smooth, horizontal floor 4, above which are disposed steel springs 5, of equal pitch. The springs are made from round wire, but they might equally well consist of flat wire or wire of any other section.

The arrangement of these springs can be clearly seen from FIG. 3. The rear end 6 of the spring 5 is free, each end being simply fitted over a guide pin 7, fixed to the rear wall 8 of the casing 3 of the device. (See FIGS. 1 and 2). In the modification shown in FIG. 7, the springs are fixed under tension with the aid of a swivel-hook 42, for example, which rubs against a washer 43 made of a self-lubricating plastics material.

The front end 10 of each spring 5 is secured to a sprocket wheel 11 or 11', by which the spring is rotated, all the springs rotating in the same direction. These sprocket wheels 11 and 11' rotate in bearings 9, at the front of the casing 3.

The end springs 5', fitted at the side edges of the floor 4 of the casing 3, are accommodated in two longitudinal recesses 13, overhung by the sidewalls of the casing 3. These sides each consist of an inclined wall 12, and of a horizontal face, 12', which caps the recess 13. The width of the device is, of course, such that, for the material concerned, no vaulted cavity can form between the two opposite walls 12. The walls 12 and face 12' at one side of the casing 3 constitute a deflector, by which the springs 5' housed in the recess 13 are relieved of the vertical pressure exerted by the flour filling the storage bin 1. The springs 5', which number three to each recess 13 in FIGS. 3, 4 and 8, thus run within a zone in which the pressure is below that in the central part of the casing 3.

In the example shown in FIGS. 3 and 4, the width of the floor 4 is equal to that of the bin 1, making it necessary to provide an inclined wall 12 to produce the recess 13. By way of modification, FIG. 8 shows a discharging device in which the floor 4 is wider than the bin 1. The sides of the casing 3 comprise a vertical wall 14, directly below the vertical sides of the bin 1, and a horizontal wall 14', which forms the top of the recess 13 and is joined to the floor 4 of the casing 3 by a vertical wall 14''. The result is exactly the same as in FIG. 4, the walls 14 and 14' constituting, by analogy, a deflector capable of relieving the space within the recess 13 of the vertical pressure of the flour.

The springs 5 are slightly raised above the floor 4 of the device by a transverse soleplate 15, so that they are completely embedded in the flour. This soleplate 15 forms the bottom plate of a metal structure 15, shown in FIGS. 1, 2 and 3 and seen in detail in FIG. 5. This structure 16 has a crossmember 17, in addition to the soleplate 15.

The soleplate 15 and the crossmember 17 are interconnected by thin longitudinal partitions of sheet metal 20, which divide the space into compartments 21, within which the springs 5 can rotate freely. These compartments 21 enable the springs 5 to be maintained in position both laterally and vertically, the structure 16 being disposed transversely in the middle of the floor 4 of the casing 3.

The springs 5 are all rotated in the same direction by the sprocket wheels 11 and 11' already referred to and two roller chains, 23, and 23', clearly visible in FIG. 3. The odd-numbered sprocket wheels 11, taken from the left of FIG. 3, are driven simultaneously by one roller chain 23, while the even-numbered sprocket wheels 11', situated in a plane parallel to that of the sprocket wheels 11, are driven by a second roller chain 23', identical to the first. The chains 23 and 23' are themselves driven by two sprocket wheels, 24 and 24', keyed on to the shaft 25 of a motor 26, equipped with reduction gear. To prevent the chains 23 and 23' from jumping out of engagement when transmitting the drive simultaneously to all the sprocket wheels 11 and 11', a bearing plate, 27, is provided (FIG. 6), to keep the rollers of each chain in engagement with the teeth of the sprocket 11 and 11', thereby preventing any sag in the driving runs of these chains 23 and 23'. The advantage of this arrangement is that it enables sprocket wheels about equal in diameter to the springs 5 to be used, the driving runs of the chains 23 and 23' behaving like a toothed rack of infinite length, while ensuring continuous lubrication of the rotating parts. Obviously, too, the chains can be driven the opposite way, if required, this tending to drive the flour back into the device.

Two types of apertures for the discharge of the flour withdrawn are shown at 30 and 31 in FIGS. 1 and 2 respectively. In FIG. 1, the discharge aperture 30 consists of an elongate opening extending transversely along the front of the floor 4 of the device 3; this opening can be closed by a shutter 32, hinged at 33. The material fed forward by the springs 5 can flow by gravity through the aperture 30 on to a conveyor or into a suitable container, the rate of flow being controlled by the extent to which the shutter 32 is opened.

In FIG. 2, the discharge opening or aperture 31 lies outside the casing 3 of the device and above the end portion 10 of the springs 5. This aperture 31 opens into a trough-shaped receptacle 35, fitted with a cover 36, from which the material can be removed; the material, in fact, mechanically fluidized and fed forward by the springs 5, can be driven into this trough 35 up to a certain level corresponding to the maximum filling of this trough. A flow-regulating shutter may also be provided (not shown).

Each spring 5 should preferably terminate, at its front end 10, in at least one turn wound in the opposite direction. FIG. 9 shows how this is done: on the spindle 10', by which the end 10 of the spring is driven, a thread 45, is tightly wound in a direction opposite to the pitch of the spring, adjacent to the bearing 9.

As it turns, this tends to move the material away from the bearing 9 and to impart to it a resultant vertical motion. This prevents the flour from being squeezed against the bearing and thus protects the seal. This protection is further improved by the provision of a tube 46, covering at least part of the thread 45.

A study of the mode of operation of the device shows that, when the springs 5 rotate simultaneously (FIG. 4), the flour in the vicinity of the springs 5 carries out a complex motion having the following components: firstly, an axial motion within the springs 5, which, if the springs are rotated in the appropriate direction, feeds the flour forward to the discharge aperture 30 or 31 at the front of the casing 3; and, secondly, two lateral motions in opposite directions, as indicated by the arrows 40 and 41, the former along the upper face of the bed of springs 5 and the latter along the underside of that bed, that is to say in the space between the springs 5 and the floor 4.

These two flows in opposite directions cause the flour to spread into the side recesses 13. Within these recesses, the flour is no longer subjected to the vertical pressure at the base of the bin 1 and is readily recovered and fed forward by the springs 5' situated within these recesses. In this way, the provision of deflectors so as to form the recesses 13 facilitates prevention of the formation of cavities in the masses of flour above the springs 5; the two lateral flows in the directions 40 and 41, instead of being compressed by the sidewalls of the holder 1 and thus promoting the tendency of the material to pack, are able to keep moving and escape by way of the side recesses 13. Moreover, the material that is directly in contact with the floor 4 of the device is constantly renewed and thus prevented from undesirably compacting. Finally, the springs can be set in motion without undue effort.

The springs must be positioned sufficiently close to one another to avoid the formation of piles of flour between adjacent springs 5, on which the flour could be supported so as to form arched cavities. The maximum gap between the springs 5 depends on the nature of the stored material; it must be such that any such supporting piles as may form between the springs 5 will be thin enough to collapse of their own accord under the weight of the material overhead. For material such as flour, the applicant has found that this gap must be less than 3 mm. In the example described, this gap is determined by the thickness of the partitions 20 in the decompression structure 16, plus a small amount of play to allow the springs 5 to rotate without rubbing against the inner faces of the compartments 21; partitions 20 having a thickness of 1 mm. have given satisfactory results.

The decompression crossmember 17 is very rigid and serves to support a major portion of the mass of flour within the limits of the anticavity action. When the length of the casing 3 is increased, the pressure of the material on the midportion of the springs may become very high, to the point of interfering with their rotation, especially upon starting. The purpose of the decompression crossmembers such as 17 is to relieve the springs of part of the pressure exerted in opposition to them. However, these crossmembers must be positioned at such intervals that they do not contribute to the formation of vaulted cavities in the longitudinal direction, which means to say that the space between two decompression crossmembers 17 must be larger than the maximum span capable of supporting a vaulted cavity in the material concerned.

In the case of the discharging device described here for flour, the spacing chosen for the decompression crossmembers was approximately 700 mm., the width of these bars being equal to at least one and a half times the pitch of the springs used. If the upper part 18 of the crossmember be given a pointed shape such as shown in the embodiment illustrated in FIG. 5, this will facilitate the descent of the flour. However, when the width of this crossmember is small in relation to the length of the storage bin, such an arrangement is not essential and a plain flat member such as shown in the other Figures will suffice.

The foregoing explanation will serve to convey the details of construction of the discharging device given here by way of example. It should be emphasized that this description does not imply any limitation on the scope of the invention and that it would be possible, in the light of the general principles enunciated above, to construct other discharging devices of very different proportions and suitable for materials other than flour, without thereby departing from the scope of the invention as set forth in the appended claims.

I claim:

1. In a device for storing and delivering particulate material having a base, a discharge opening at one end thereof, a plurality of elongated rotary particle extracting members extending from said opening in spaced parallel relationship adjacent said base and drive means for simultaneously rotatably driving one end of each of said elongated members, the combination wherein said elongated particle extracting members consist essentially of spiral coils defining fully open axially extending core areas permitting the particulate material to completely surround the coils and fill the entire axial core areas and wherein said base is a substantially flat member, said coils being positioned juxtaposed each other and said base and the ends of said coils opposite said one end being rotatably secured under tension adjacent said base whereby rotation of said coils by said drive means effects particle flow laterally of said coils between said base and said coils and between adjacent coils thereby preventing formation of arching voids within the particulate material being extracted.

2. The device of claim 1 including particle deflector means protecting at least one of said coils from the static pressure of the particulate material.

3. The device of claim 2 wherein the particle deflector means includes a pair of deflector elements defining longitudinally extending recesses, at least one of said coils being positioned within each recess.

4. The device of claim 1 including crossmember means for protecting a midportion of said coils from the static pressure of the particulate material.

5. The device of claim 4 wherein the crossmember means includes individual compartments through which the coils freely extend.

6. The device of claim 1 including a trough and wherein the discharge opening communicates with the base of said trough facilitating extraction of the particulate material into the trough for collection.

7. The device of claim 1 wherein immediately adjacent coils are spaced from each other by a distance less than 3 millimeters.

8. A device according to claim 1 comprising sprocket wheels,
   chain drive means meshing with the sprocket wheels, and
   a bearer plate biasing the chain drive means into engagement with the sprocket wheels, the coils being rotatable by the sprocket wheels.

9. A device according to claim 1, in which each spiral coil terminates at its front end in a thread comprising at least one turn of opposite hand.

10. A device according to claim 9, comprising a tube which covers at least partially the thread of opposite hand.